United States Patent [19]

Schalk

[11] Patent Number: 5,177,389

[45] Date of Patent: Jan. 5, 1993

[54] TACHO GENERATOR

[75] Inventor: Adelbert Schalk, Wutöschingen, Fed. Rep. of Germany

[73] Assignee: Deutsche Thomson-Brandt GmbH, Fed. Rep. of Germany

[21] Appl. No.: 628,911

[22] Filed: Dec. 18, 1990

[51] Int. Cl.⁵ .......................................... H02K 17/42
[52] U.S. Cl. .................................. 310/171; 310/688; 310/156; 310/179; 310/184; 310/268; 310/DIG. 6
[58] Field of Search ............... 310/208, 688, 171, 179, 310/180, 188, 184, 198, 185, 207, 156, 268, DIG. 3, DIG. 6; 324/174

[56] References Cited

U.S. PATENT DOCUMENTS

| 4,410,853 | 10/1983 | Ikoma | 324/167 |
| 4,488,076 | 12/1984 | MacLeod | 310/171 |
| 4,695,795 | 9/1985 | Nakamazio et al. | |
| 4,751,415 | 6/1988 | Kitamori | 310/156 |
| 4,755,701 | 7/1988 | Shikama | 310/156 |
| 5,045,740 | 9/1991 | Hishinuma | 310/156 |

FOREIGN PATENT DOCUMENTS

| 0149360 | 7/1985 | European Pat. Off. |
| 60241756 | 5/1984 | Japan |
| 62262645 | 9/1986 | Japan |
| 8401477 | 4/1984 | World Int. Prop. O. |
| 12925 | 12/1989 | World Int. Prop. O. |

Primary Examiner—R. Skudy

Attorney, Agent, or Firm—Joseph S. Tripoli; Joseph J. Laks; Harvey D. Fried

[57] ABSTRACT

A servo controlled motor has an annular coil arrangement with meander-shaped windings and an annular arrangement of magnetic pole pairs, positioned for concentric relative rotation. A first coil is formed by a first number of the windings aligned at a first angle and with consistent pitch relative to a diameter line. A first number of pole pairs are aligned at the first angle and correspond in number and pitch to the first number of windings. A second coil is formed by a second number of windings. The second number of windings is aligned at a second angle relative to the diameter line. A second number of the pole pairs are aligned at the second angle and correspond in number and pitch to the second number of windings. Voltages are induced in the second coil by the second, but not by the first, number of pole pairs. Alternatively, the first number of windings define a grid of winding positions. A second coil is formed by a second number of windings aligned at the first angle. Some of the second number of windings are disposed in winding positions and others are offset from winding positions. A second number of the pole pairs aligned substantially at the first angle correspond in number and relative position to the second number of windings. Voltages induced in the second number of windings by the first number of pole pairs substantially cancel out, but voltages induced by the second number of pole pairs add together.

26 Claims, 8 Drawing Sheets

TACHO GENERATOR

This application is a continuation of International Application No. PCT/EP89/00663, filed Jun. 13, 1989.

The invention relates to the field of tacho generators, and in particular, to tacho generators for servo controlled motors of the kind used for driving head cylinders in video recorders.

A tacho generator for a servo controlled motor is generally provided with a fixed coil, or stator, and a rotating magnetic disc, or rotor. The coil is a flat coil arrangement having a zig-zag or meander-shaped form arranged between inner and outer circular boundaries defining an annular zone or area. The coil comprises a plurality of individual windings which are connected in series to define the zig-zag or meander-shaped form. The magnetic disc, which is closely spaced above the annular coil arrangement and rotates about an axis centrally aligned with the annular arrangement, is provided with North-South (N-S) magnetic pole pairs. The magnetic disc embodies a concentric rotatable annular arrangement of the magnetic pole pairs.

The individual windings of the zig-zag or meander-shaped coil, and the associated pairs of poles in the rotor or disc, are arranged with their longitudinal axis generally radially disposed with respect to the center of the annular zone and the axis of rotation of the disc, which are substantially coaxial. A signal is generated in the coil formed by the meander-shaped arrangement of the individual windings during the rotation of the disc. The signal has a frequency dependent upon the rotational speed of the disc. This signal is evaluated, for example in the servo system of a video recorder, in order to derive therefrom a control signal for readjusting the rotational speed of the motor. In addition, known systems are provided with a second tacho generator arrangement, sometimes referred to as a pick-up pulse generator, through which one or more switch-over impulses are generated with every revolution of the disc. These impulses are useful for synchronizing control of the motor with respect, for example, to a recorded signal and the control procedures in a video recorder.

A tacho generator for a servo controlled motor as taught herein also has an annular coil arrangement with meander-shaped windings and has an annular arrangement of North-South magnetic pole pairs. The coil arrangement and the arrangement of pole pairs are positioned for concentric rotation relative to one another.

In accordance with an inventive arrangement, a first coil is formed by a first number of the windings, which can constitute a majority of the windings. The first coil has an average diameter. The first number of the windings are aligned at a first azimuth angle and with consistent pitch relative to a diameter line of the annular coil arrangement. A first number of the pole pairs corresponds in number and pitch to the first number of the windings. The first number of the pole pairs are aligned at the first angle.

A second coil is formed by a second number of the windings distributed over the annular coil arrangement. The second coil has substantially the same average diameter as the first coil. The second number of the windings are aligned at a second azimuth angle relative to the diameter line. A second number of the pole pairs correspond in number and pitch to the second number of the windings and are aligned at the second angle. Voltages are induced in each winding of the second coil by the second number of pole pairs, but not by the first number of pole pairs, during the relative rotation. The second coil can be arranged to generate one or more pick-up impulses during each complete relative revolution of the annular arrangements.

Advantageously, the first angle is a positive angle and the second angle is a negative angle. The first and second angles can have substantially the same absolute numerical value, but opposite signs, for example approximately +45 degrees and approximately −45 degrees, respectively.

In accordance with another inventive arrangement, the windings of the first coil define a grid of winding positions having consistent pitch. A first number of the pole pairs correspond in number and pitch to the first number of the windings. The first number of the pole pairs are aligned substantially at the first angle. The first angle can be approximately zero degrees according to this inventive arrangement.

A second coil is also formed by a second number of the windings distributed over the annular coil arrangement. The second coil can also have the same average diameter as the first coil. However, the second number of the windings are also aligned substantially at the first angle. Some of the second number of the windings are disposed in respective ones of the winding positions, whereas others of the second number of the windings are disposed offset from the winding positions. A second number of the pole pairs correspond in number and relative position to the second number of the windings. The second number of pole pairs are also aligned substantially at the first angle angle. Voltages of equal phase are induced in each of the windings in the second coil by the second number of pole pairs, but voltages induced in the second number of windings by the first number of pole pairs are substantially cancelled out by one another.

Advantageously, the second number of the windings in the second coil is an even number. A first half of the even number of windings are disposed in accordance with the winding positions and a second half of the even number of windings are disposed offset from the winding positions. The offset corresponds to approximately one half of the spacing between adjacent winding positions.

Different signals are therefore generated by only one tacho generator arrangement in accordance with the foregoing inventive arrangements. This can be accomplished by means of the effect of the different azimuth angles of inclination of the windings in the first and second coils respectively, in the stator part, as well as the correspondingly inclined pole pairs in the rotor, which generate different signals from only one tacho generator. A signal having a fixed frequency for the regulation of the motor speed is generated in a generator part, for example from the meander-shaped windings of the first coil which can be inclined, for example by an azimuth angle of approximately +45 degrees. The pick-up impulses, on the other hand, can be generated in the second coil, whose meander-shaped windings are inclined by a different azimuth angle, for example −45 degrees. Both coils have the same average winding diameters.

The arrangement of the respective sets of pole pairs in the rotating part must correspond with the arrangement of the respective coils both in their number and alignment direction, that is, the angle of inclination.

This can be achieved by a magnetization process of the magnetic disc, by means of a single pole pair which can be positioned appropriately through a turnable adjustment means. This way, for example, the magnetization for the rotation speed regulation, that is for the frequency generator, is carried out first in that pole pairs are magnetized-on with an angle of inclination of +45 degrees, for example, around the entire annular zone. In a second magnetization process, a number of individual pole pairs aligned at an angle of inclination of −45 degrees, for example, can be written over the first pole pairs at positions and spaced intervals corresponding to the windings of the second coil.

Alternatively, this can also be accomplished by means of interleaved coils with the same coil diameters and with all windings and pole pairs inclined at the same azimuth angle, which can be zero degrees. However, some of the windings for the pick-up coil and their associated magnetic pole pairs are in positions consistent with the positions of the windings of the first coil, whereas others of the windings and pole pairs for the pick-up coil are circumferentially displaced or offset, for example by one half the graduation of spacing between adjacent winding positions of windings in the first coil.

In a certain position of the magnetic disc with respect to the pick-up coil, equiphase voltages are induced in the individual windings by the associated magnetic pole pairs which, by addition, generate one impulse per revolution. The graduation in the frequency generator is constant. Consequently, an equal number of equiphase and antiphase voltages are induced by the magnetic pole pairs of the frequency generator in the windings of the pick-up coil which voltages eliminate each other by addition. It is also possible to generate two or more impulses during one revolution in the pick-up coil by means of appropriate design of the arrangement of the magnetic pole pairs.

Figure 1:
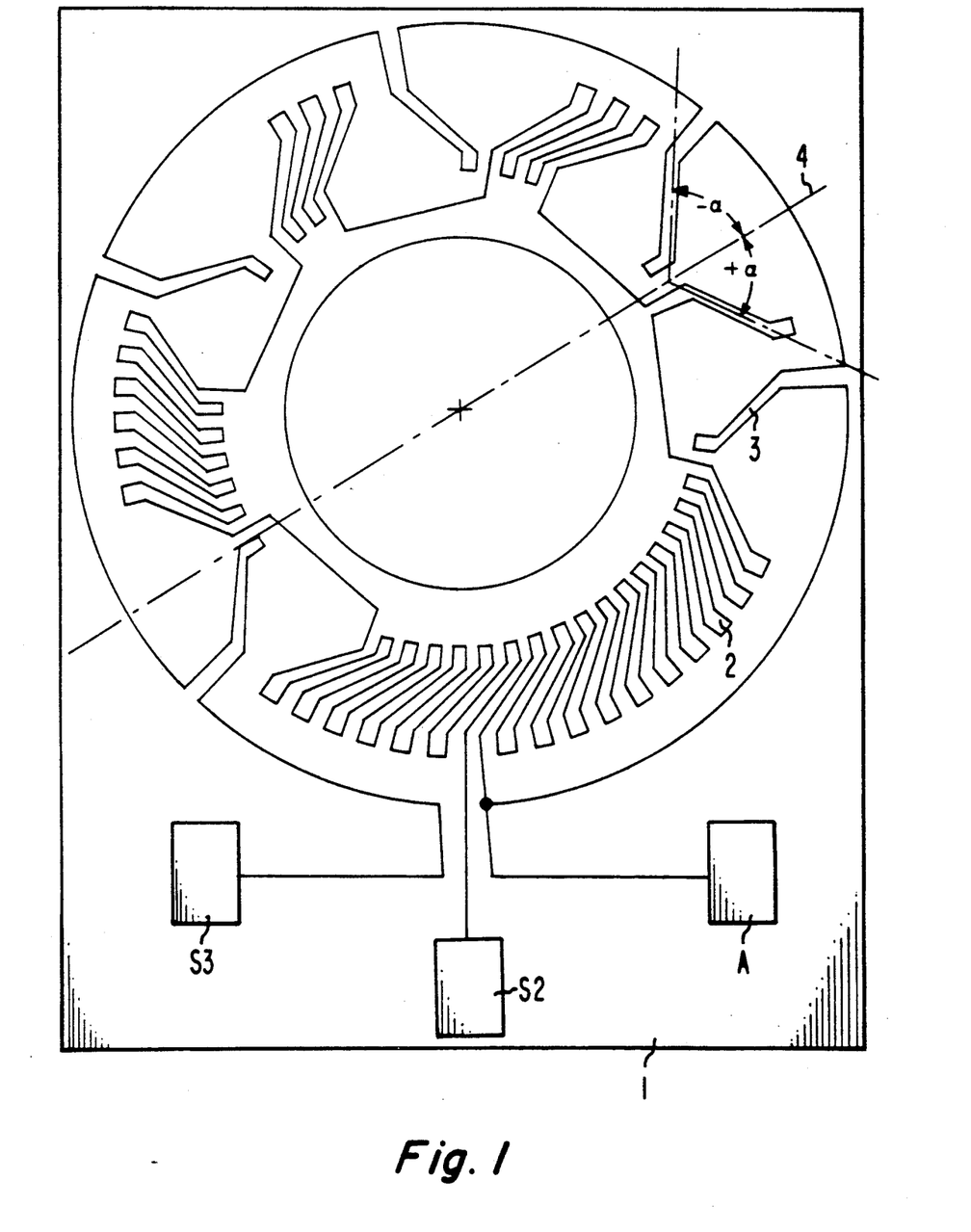
FIG. 1 shows an arrangement of the meander-shaped windings on a single level for two coils having respective windings with different azimuth angle displacements.

FIG. 1 illustrates an arrangement of zig-zag, meander-shaped windings on a single level defining two coils 2 and 3 with respective azimuth angle orientations relative to an arbitrary or representative diameter line 4 of the winding arrangement. Coils 2 and 3 are disposed in circular form in an annular zone, for example as printed strip conductors on common mounting board 1. Each coil has a plurality of individual windings disposed generally radially within the annular zone. The windings of coils 2 and 3 are interleaved with one another and have a common connection point A. Coil 2 serves as frequency generator. The individual windings of its meander-shaped form are disposed at a positive azimuth angle $+\alpha$ with reference to the diameter line 4. The individual windings are coupled in a series connection. The point S2 forms the other connection point for coil 2. Coil 3 is provided for the generation of pick-up signals. The individual windings of coil 3 are disposed at a negative azimuth angle $-\alpha$ relative to the diameter line 4. The other connection point for coil 3 is S3. In the present example, two coils interleaved with each other are represented. It is also possible, however, to arrange further coils in the annular zone, for example, for the generation of further pick-up signals.

Figure 2:
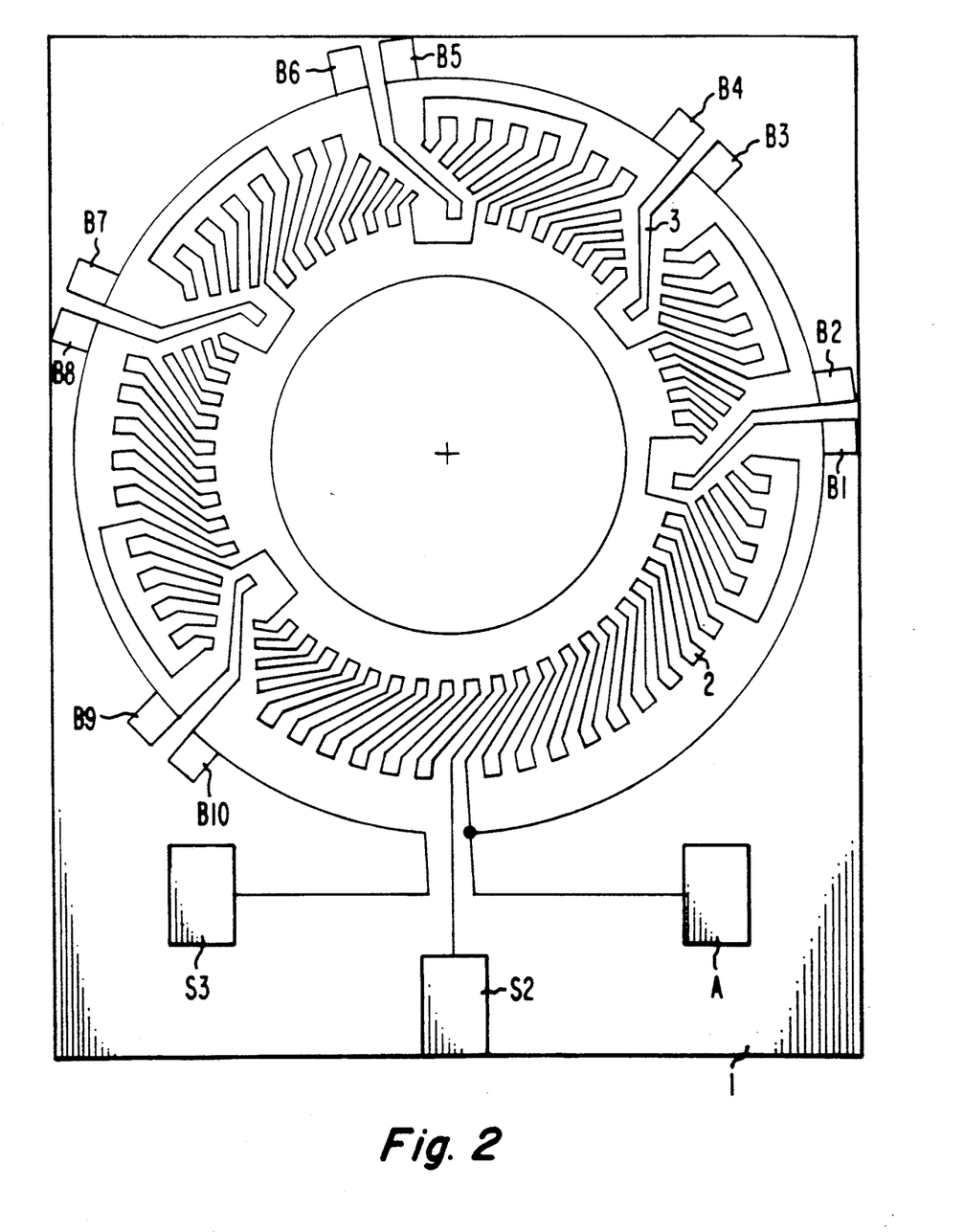
FIG. 2 shows an arrangement similar to FIG. 1, but which develops a higher amplitude frequency generator signal.

FIG. 2 illustrates an arrangement of a modified coil 2′ whereby a higher amplitude of the frequency generator signal is attained. Several individual impulses can be generated and detected at the connections B1 through B10 of coil 3. In yet another embodiment, not shown, with a circuit board constructed with a double-sided lamination, whose thickness should be kept as small as possible, it is possible to provide a first coil continuously on one side of the board and a second coil continuously on the other side of the board, without the need for interleaving.

Figure 3:
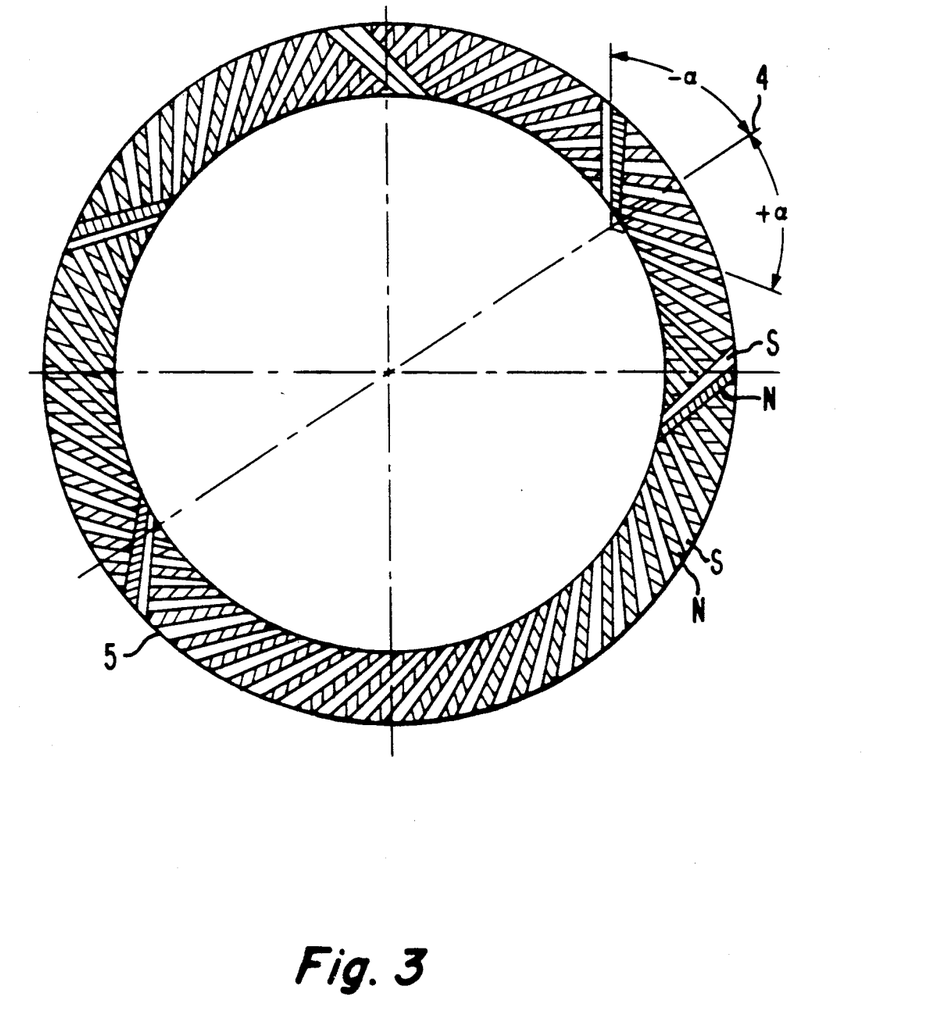
FIG. 3 shows an arrangement for the magnetization of a magnetic disc for use with the coils shown in FIG. 1.
Figure 4:
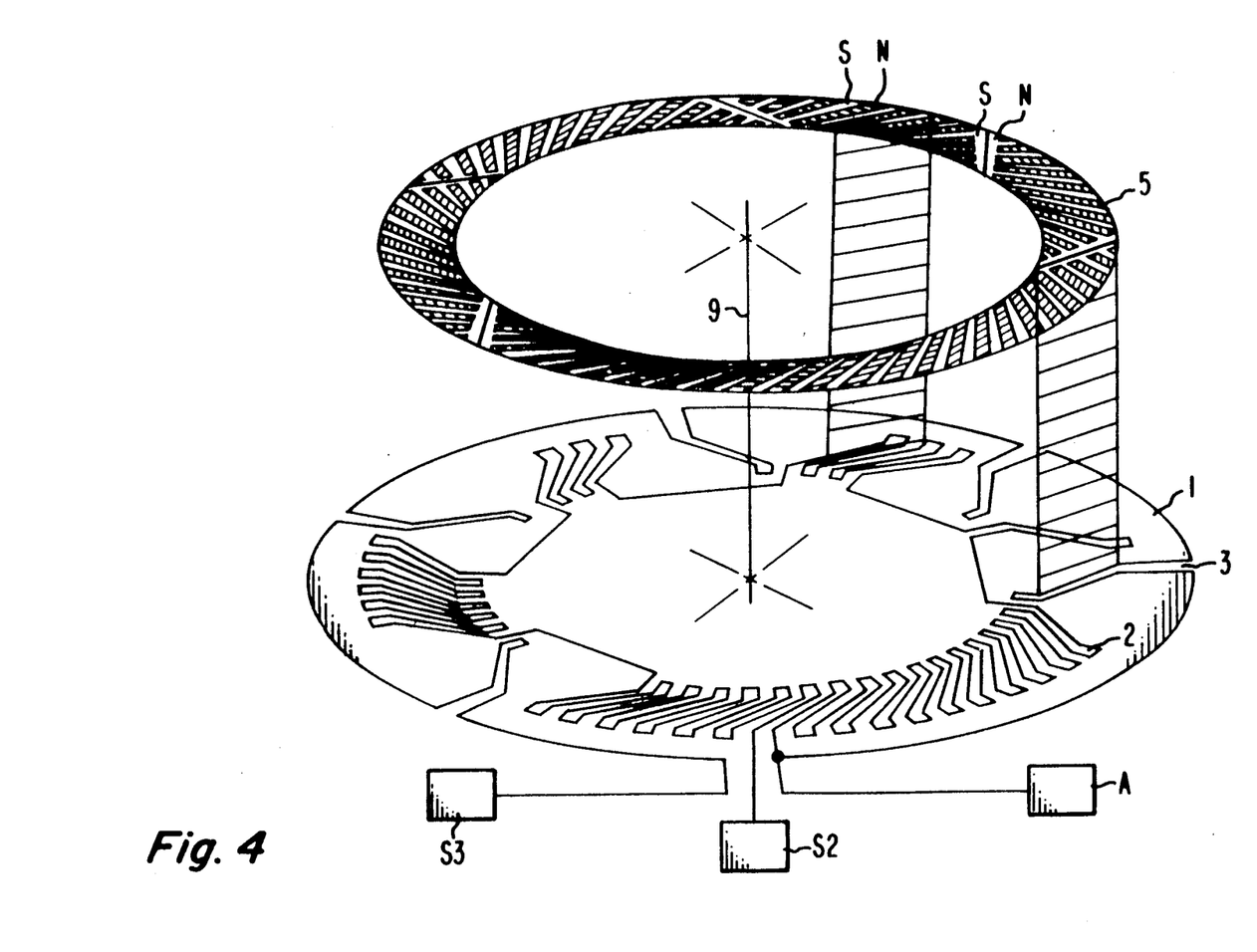
FIG. 4 shows the spatial association of the windings of the coils shown in FIG. 1 and the pole pairs of the magnetic disc shown in FIG. 3.

FIG. 3 illustrates an arrangement for magnetization of a magnetic disc 5 useful in association with the winding arrangement of coils 2 and 3 shown in FIG. 1. The magnetic pole pairs are embodied a concentric annular arrangement or ring. The disc 5 is coupled with the rotatable part of the motor by means of a known connection, not shown. The magnetic disc 5 is arranged concentrically with and closely spaced from the fixed circuit board, as can be seen from FIG. 4, in order to generate a signal level as large as possible upon rotation of the disc relative to the winding arrangement. The annular zone in which coils 2 and 3 are disposed, and the ring of the disc 5 are coaxial, shown by common axis 9. The indicated N-S pole pairs correspond in their geometric arrangement with the arrangement of the windings of FIG. 1. A majority of the pole pairs are arranged at the positive azimuth angle $+\alpha$, whereas five pole pairs have the negative azimuth angle $-\alpha$. When the disc rotates, the fie magnetic pole pairs and the associated windings of coil 3 face each other in direct opposition once in every revolution. Individual voltages are induced in each of these windings in accordance with the law of induction, so that five times the voltage of a single winding is present at connection S3 of coil 3. However, upon further rotation of the rotor, or respectively, the magnetic disc, only a small voltage is induced in coil 3 through the pole pairs with the azimuth angle for the frequency generator. The desired pick-up impulses can be clearly be distinguished from the frequency generator voltage.

Figure 5A:
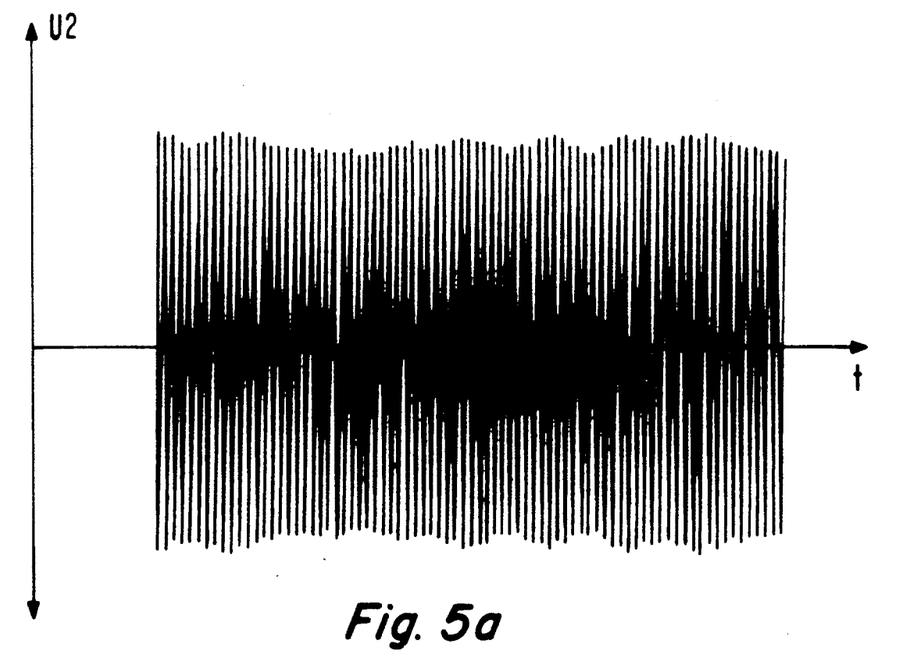
FIGS. 5a and 5b show the waveforms generated by the frequency generator coil and the pick-up impulse coil, respectively, for the tacho generator arrangement shown in FIG. 4.
Figure 5B:
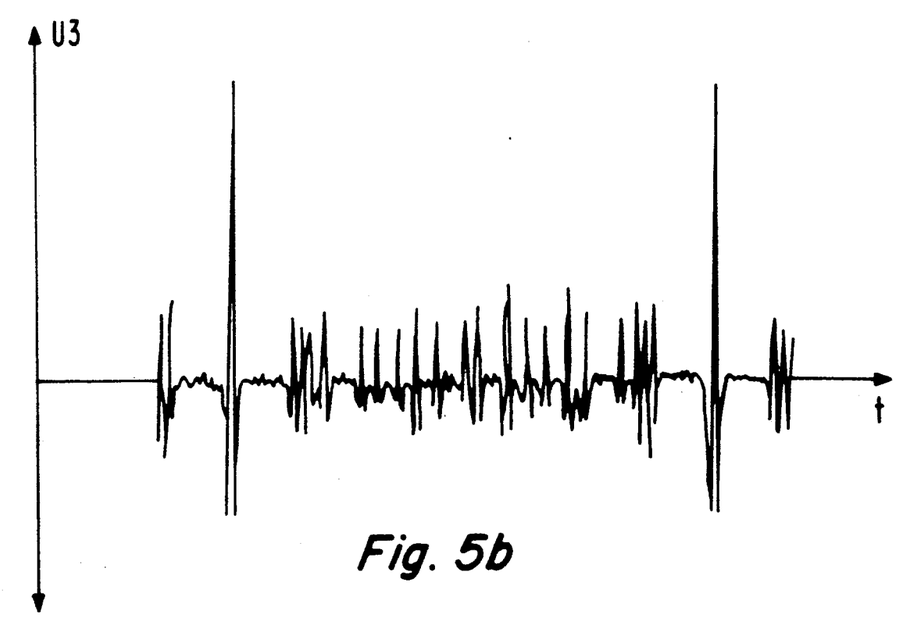

The waveforms of the signals generated in the coils 2 and 3 are represented in FIGS. 5a and 5b. FIG. 5a illustrates the voltage waveform U2 of the signals from the frequency generator of coil 2. FIG. 5b illustrates the voltage waveform U3 of the pick-up signals generated in coil 3.

Figure 6A:
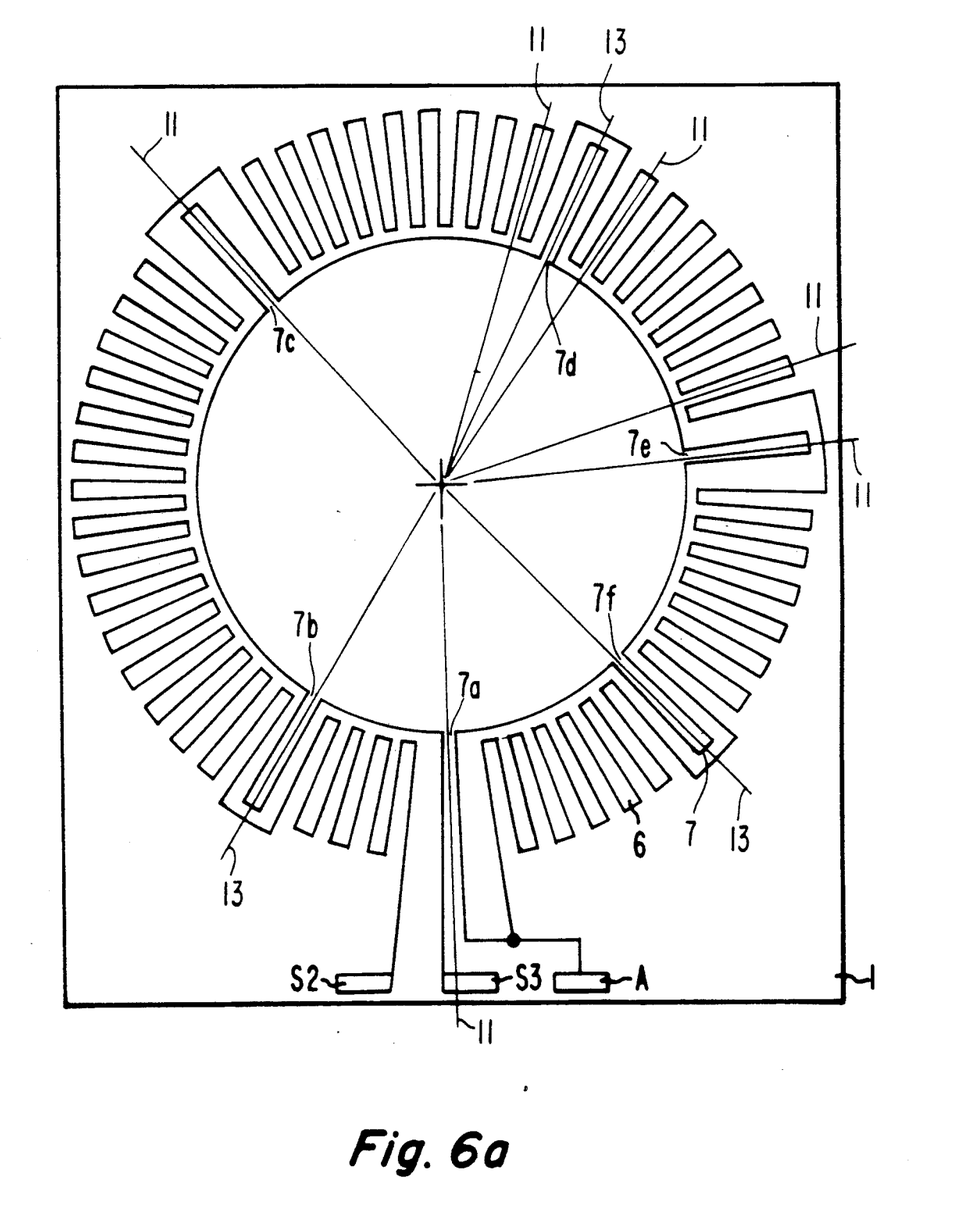
FIGS. 6a and 6b show an arrangement of the coils and pole pairs, respectively, wherein the windings of both coils and all of the pole pairs are inclined at the same azimuth angle, but some of the windings of one coil and the corresponding pole pairs are circumferentially displaced relative to the windings of the other coil and the corresponding pole pairs.
Figure 6B:
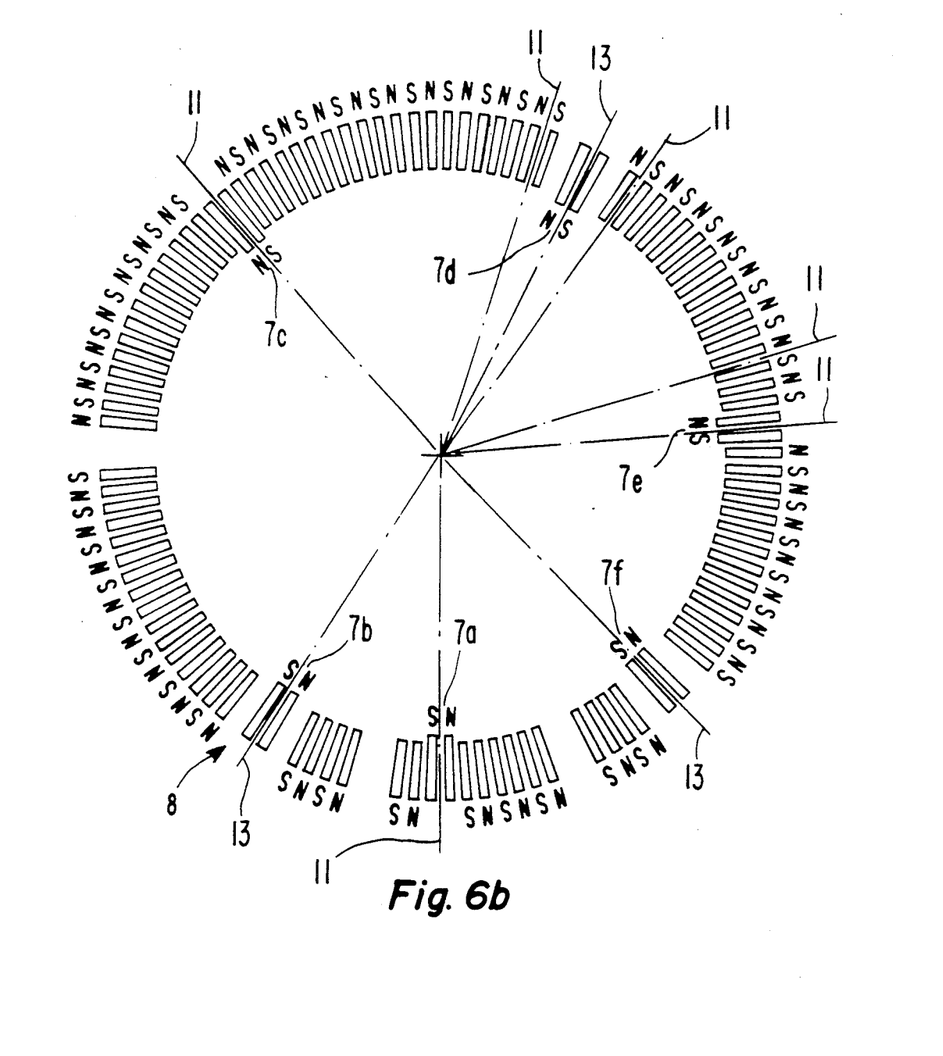
Figure 7:
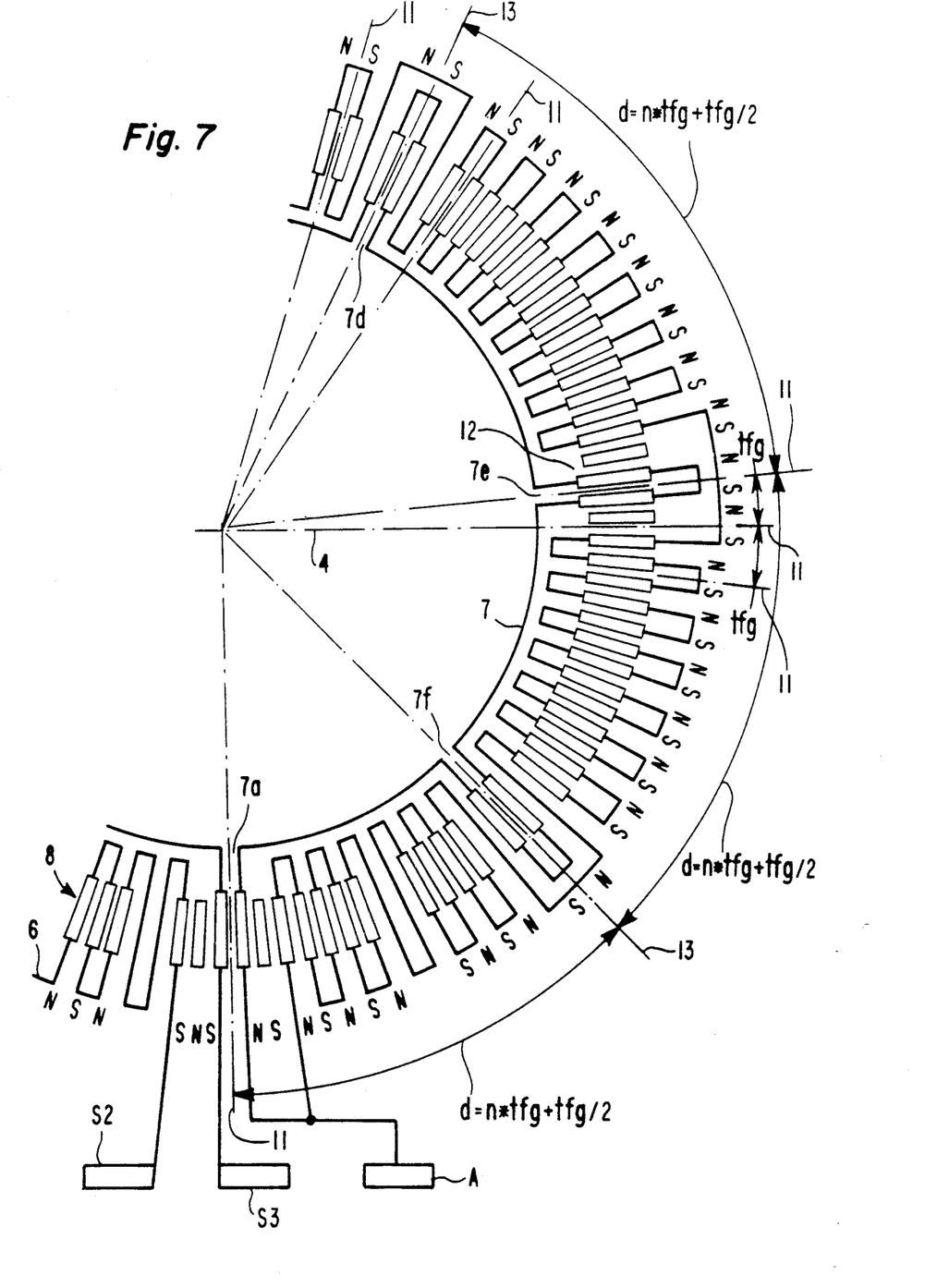
FIG. 7 shows a portion of the windings of FIG. 6a and the associated magnetic pole pairs of FIG. 6b in enlarged scale.

An alternative embodiment is based generally on the spacing between windings and magnetic pole pairs respectively, rather than angular orientation. The winding arrangement of the alternative embodiment is shown in FIG. 6a. The corresponding arrangement of magnetic pole pairs is shown in FIG. 6b. The manner in which these concentric arrangements overlap is shown in FIG. 7 in enlarged scale, but for only a portion thereof due to space limitations. The following discussion refers to features which are shown in one or more of these FIGURES, but not necessarily all of them.

A mounting board 1 has on it an arrangement of the meander-shaped windings in a single level for two coils 6 and 7 having the same average coil diameter and having the same azimuth displacement. In this case, the azimuth displacement is approximately zero degrees. Coils 6 and 7 are disposed on the common mounting board 1 in circular form in an annular zone, for example as printed strip conductors. The windings of the coils are interleaved with one another and have a common connection point A. The coil 6 serves as frequency generator. The meander-shaped windings of coil 6 are coupled in series and are positioned to define recesses in which the windings of coil 7 are situated, that is, interleaved. The individual windings of coil 7 are designated clockwise 7a, 7b, 7c, 7d, 7e and 7f. The point S2 forms the other connector for coil 6. Coil 7 is provided for the generation of pick-up signals. The other connection point for coil 7 is S3. Coil 6 is provided for the frequency generator and has many windings, all with a constant graduation or spacing, relative to a center line. The positions of all of the six windings of coil 7 (not shown) do not have a constant graduation, or the same graduation relative to the diameter line 4.

The individual windings of coil 6 define a grid of winding positions. A number of grid lines 11 as shown, one of which is coextensive with center line 4. The grid lines 11 are separated by an angular displacement designated tfg. Adjacent windings of the first coil 6 are equally angularly spaced from each grid line 11.

The individual windings of coil 7, 7a through 7f are placed in such a way that the graduation, that is spacing and position, of the windings 7a, 7c, and 7e corresponds to the grid lines of the windings for the frequency generator, coil 6. In other words, half of the windings of coil 7 are positioned according to and consistently with the grid lines, just as all of the windings of the first coil 6. However, the windings 7b, 7d, and 7f are in positions offset or displaced by half a graduation relative to the positions of the windings of the frequency generator and the windings 7a, 7b and 7c. The offset corresponds to approximately one-half of the spacing between the windings.

The scale of FIG. 7 is too large to show all of the windings of the coils 6 and 7 corresponding magnetic and the pole pairs of a disc 8. The windings 7d, 7e, 7f and 7a of coil 7 are shown in relationship to several of the grid lines 11. Windings 7e and 7a are also illustrative of the position of winding 7c. Windings 7d and 7f are also illustrative of the position of winding 7b. There are no first windings in the gap 12. Nevertheless, the respective magnetic pole pairs drawn above winding 7e, and winding 7a just like the winding 7e, are positioned relative to the grid lines 11 just as the windings of coil 6. In other words, windings 7e and 7a are centered relative to a grid line 11. On the other hand, windings 7d and the associated magnetic pole pairs, are displaced by half a graduation. The angular displacement from winding 7e to winding 7f is d, where d = n * tfg − tfg/2, and n is an integer number of graduations or spacing intervals. In other words, windings 7d and 7f are not centered on a grid line 11. Instead, windings 7d and 7f define alternative grid lines 13 which are not consistent with the pitch, or graduation, of the grid lines 11. Winding 7b is also positioned relative to an alternative grid line consistent with grid line 13. Grid lines 13 have a consistent pitch, or graduation, relative to grid lines 11, namely angularly offset by a distance tfg/2.

The position of the magnetic disc 8 corresponds with the state in which all six pick-up magnetic pole pairs stand above the associated windings of oil 7. Consequently, the individual winding voltages are in phase and add up to form a pick-up impulse. Accordingly, the magnetic pole pairs of the frequency generator induce voltages in the individual windings of the pick-up coil which substantially cancel out one another by addition. Thus, no voltage is generated by the magnetic pole pairs of the frequency generator in the coil 7. However, the magnetic pole pairs for the pick-up generator associated in their arrangement with the windings of the pick-up coil, like the windings of coil 7, also have three magnetic pole pairs displaced by half a graduation. Therefore, in a predetermined position of the magnetic disc 8 during one revolution, voltages of the same phase are induced in all six windings of the pick-up coil, which add up to form a pick-up impulse with a large amplitude.

What is claimed is:

1. A tacho generator for a servo controlled motor, comprising:
    an annular coil arrangement with first and second numbers of meander-shaped windings;
    an annular arrangement of North-South magnetic pole pairs, said annular coil arrangement and said annular arrangement of North-South magnetic pole pairs being positioned for concentric rotation relative to one another;
    a first coil formed by said first number of said meander-shaped windings aligned at a first angle and with consistent pitch relative to a diameter line of said annular coil arrangement;
    a first number of said North-South magnetic pole pairs corresponding in number and pitch to said first number of said meander-shaped windings, said first number of said North-South magnetic pole pairs aligned at said first angle;
    a second coil formed by said second number of said meander-shaped windings distributed over said annular coil arrangement, said second number of said meander-shaped windings aligned at a second angle relative to said diameter line; and,
    a second number of said North-South magnetic pole pairs corresponding in number and pitch to said second number of said meander-shaped windings and aligned at said second angle, voltages being induced in each winding of said second coil by said second number of North-South magnetic pole pairs, but not by said first number of North-South magnetic pole pairs, during said relative rotation.

2. A tacho generator according to claim 1, wherein said first angle is a positive angle and said second angle is a negative angle.

3. A tacho generator according to claim 2, wherein said first and second angles have substantially similar absolute numerical values.

4. A tacho generator according to claim 1, wherein said first and second angles are approximately +45 degrees and approximately −45 degrees, respectively.

5. A tacho generator according to claim 1, wherein said first and second angles have substantially similar absolute numerical values but opposite signs.

6. A tacho generator according to claim 1, wherein said first and second coils are disposed on one side of a circuit board and are interleaved with one another.

7. A tacho generator according to claim 6, wherein said first and second number of North-South magnetic magnetic pole pairs are positioned according to said interleaving of said first and second coils.

8. A tacho generator according to claim 1, wherein said first and second number of North-South magnetic magnetic pole pairs cross one another.

9. A tacho generator according to claim 1, wherein said second coil is arranged to generate one pick-up impulse during each complete relative revolution of said annular coil arrangement sand said annular arrangement of North-South magnetic magnetic pole pairs.

10. A tacho generator according to claim 1, wherein said second coil is arranged to generate more than one pick-up impulse during each complete relative revolution of said annular coil arrangement and said annular arrangement of North-South magnetic magnetic pole pairs.

11. A tacho generator according to claim 1 wherein said first and second annular coils have substantially similar average coil diameters.

12. A tacho generator according to claim 1, wherein said first number of said meander-shaped windings constitute a majority of said meander-shaped windings.

13. A tacho generator for a servo controlled motor, comprising:
   an annular coil arrangement with first and second numbers of meander-shaped windings;
   an annular arrangement of North-South magnetic pole pairs, said annular coil arrangement and said annular arrangement of North-South magnetic pole pairs being positioned for concentric rotation relative to one another;
   a first coil formed by said first number of said meander-shaped windings aligned at an angle relative to a diameter line of said annular coil arrangement and defining a grid of winding positions having consistent pitch;
   a first number of said North-South magnetic pole pairs corresponding in number and pitch to said first number of said meander-shaped windings, said first number of said North-South magnetic pole pairs aligned substantially at said angle;
   a second coil formed by said second number of said meander-shaped windings distributed over said annular coil arrangement, said second number of said meander-shaped windings aligned substantially at said angle, some of said second number of said meander-shaped windings disposed in respective ones of said winding positions and others of said second number of said meander-shaped windings disposed offset from said winding positions; and,
   a second number of said North-South magnetic pole pairs corresponding in number and relative position to said second number of said meander-shaped windings, said second number of North-South magnetic pole pairs aligned substantially at said angle.

14. A tacho generator according to claim 13, wherein voltages of equal phase are induced in each of said meander-shaped windings in said second coil by said second number of North-South magnetic pole pairs.

15. A tacho generator according to claim 14, wherein voltages induced in said second number of meander-shaped windings by said first number of North-South magnetic pole pairs are substantially cancelled out by one another.

16. A tacho generator according to claim 13, wherein voltages induced in said second number of meander-shaped windings by said first number of North-South magnetic pole pairs are substantially cancelled out by one another.

17. A tacho generator according to claim 13, wherein said angle is approximately zero degrees.

18. A tacho generator according to claim 13, wherein said first and second coils are disposed on one side of a circuit board and are interleaved with one another.

19. A tacho generator according to claim 18, wherein said first and second number of North-South magnetic magnetic pole pairs are interleaved with one another.

20. A tacho generator according to claim 13, wherein said first and second number of North-South magnetic magnetic pole pairs are interleaved with one another.

21. A tacho generator according to claim 13, wherein said second coil is arranged to generate one pick-up impulse during each complete relative revolution of said annular coil arrangement and said annular arrangement of North-South magnetic magnetic pole pairs.

22. A tacho generator according to claim 13, wherein said second coil is arranged to generate more than one pick-up impulse during each complete relative revolution of said annular coil arrangement and said annular arrangement of North-South magnetic magnetic pole pairs.

23. A tacho generator according to claim 13, wherein said second number of said meander-shaped windings in said second coil is an even number.

24. A tacho generator according to claim 23, wherein a first half of said even number of meander-shaped windings of said second coil are disposed in accordance with said winding positions and a second half of said even number of meander-shaped windings of said second coil are disposed offset from said winding positions.

25. A tacho generator according to claim 14, wherein said offset corresponds to approximately one half of the spacing between adjacent winding positions.

26. A tacho generator according to claim 24, wherein voltages induced in said first half of said second number of meander-shaped windings by said first number of North-South magnetic pole pairs are substantially out of phase with voltages induced in said second half of said second number of meander-shaped windings by said first number of North-South magnetic pole pairs, said voltages induced in said second coil by said second number of meander-shaped windings substantially cancelling out one another.

* * * * *